Patented Sept. 17, 1929

1,728,662

UNITED STATES PATENT OFFICE

AUGUST CHWALA, OF VIENNA, AUSTRIA

PROCESS FOR MANUFACTURING COLLOIDAL COMPOUNDS

No Drawing. Application filed October 5, 1927, Serial No. 224,284, and in Austria March 30, 1927.

The invention relates to a process for the mechanical dispersion of water insoluble salts of the arsenic acids and of the phosphoric acids, by the term "water insoluble salts" being understood the earth-alkali salts and the heavy metal salts of the respective acids.

As is well known, arsenic acids and phosphoric acids as well as their salts show a far going affinity (close relationship) and in many respects behave very similarly or quite analogously. In view of this fact the term "salts of acids of the arsenic group" is employed in the following for the salts of the arsenic acids as well as for those of the phosphoric acids.

It is known that the insoluble salts of acids of the arsenic group, such as for instance arsenates of lead, copper, calcium or calcium phosphates can only with great difficulties be transformed into the colloidal state.

According to the present invention dispersing of insoluble salts of the acids of the arsenic group is carried out in the presence of alkali salts of water poor acids of the arsenic group, that is to say of alkali salts of those phosphoric and arsenic acids, which are formed from the ortho-acids by water being split off or which may be regarded as having been formed in this manner.

I have found that the alkali salts of these water poor acids perform an excellent action as peptizators. Of these alkali salts of water poor acids of the arsenic group may for instance be named the alkali-meta-phosphates (salts of meta-phosphoric acid $HPO_3$), particularly polymeric alkali-meta-phosphates, such as of the trimetaphosphates, tetrametaphosphates, hexametaphosphates, e. g. potassium-sodium-metahexaphosphate; the alkali-pyrophosphates (salts of pyrophosphoric acid $H_4P_2O_7$), the alkali-meta-arsenates (salts of meta-arsenic acid $HAsO_3$) and alkali-pyro-arsenates, e. g. sodium-pyroarsenate ($Na_4As_2O_7$). Moreover, belong to this kind of peptizing agents also the alkali salts of the corresponding thio-acids, that is to say the salts of the water poor acids of the arsenic group, in which the oxygen of the acids is entirely or partly replaced by sulfur. Of this kind of salts particularly sodium-pyro-thio-arsenate has been found very effective.

It is of particular importance, that by means of these peptizing agents calcium arsenate, which hitherto could only be worked up to coarse dispersions, can be brought into the truly colloidal state. The transformation into this state is advanced, if the calcium arsenate employed as raw material is prior to the mechanical treatment freed from water. The best result is obtained, if the calcium arsenate is for this purpose dehydrated by heating it considerably above 100° C. up to 600° C. The colloidal calcium arsenate is characterized by the fact, that it has, when distributed in water, a hydrogen ion concentration between $P_H=7.07$ and $P_H=10$. Owing to this concentration, which coincides with the neutral point or is very close to it, there is no risk of plants being burnt or deteriorated, when the said colloid is employed for destroying the plant parasites.

For producing the disperse system any known mechanical means, such as beating mills, colloid mills and the like may be employed. But it is also sufficient to intimately mix the material to be dispersed with the peptizing agent, for instance by means of a simple agitator. Advantageously the mechanical treatment is carried out in the presence of protective colloids for instance sulfite liquor. The material to be comminuted may be disintegrated either in a dry or in a moisted or in a perfectly wet state, for instance under addition of water.

*Examples*

1. 1000 grammes of calcium arsenate are together with 800 grammes of water and 50 grammes of potassium-sodium-hexametaphosphate for instance in a colloid-mill intimately disintegrated and beaten during 60 minutes. This dispersion may also be carried out in presence of 50 grammes of sulfite-liquor. The product thus obtained is a paste, which, when mixed with water, gives a colloidal solution. The paste may be dried by means of a roller drying apparatus or by spraying it through a nozzle into warm air, Also the dried product can be dissolved in water.

2. 1000 grammes of calcium arsenate are with 800 grammes of water triturated in a colloid-mill during 60 minutes while 100 grammes of sodium-pyro-thio-arsenate are added successively by portions. The resulting paste may be dried in the manner indicated in Example 1, the dry product dissolves just as well as the pasty product in water. The colloidal solution shows the Brown movement characteristic for true colloids.

3. 1000 grammes of calcium phosphate are with 800 grammes of water and 100 grammes of sodium-pyrophosphate beaten in a colloid-mill during 90 minutes. The resulting paste is just as is the case in Examples 1 and 2 homogeneous, it can be dried according to Example 1 and the product behaves in the dry state as well as in the moisted state towards water as a colloid.

4. 1000 grammes of lead arsenate are triturated with 800 grammes of water and 70 grammes of sodium-pyro-thio-arsenate in a colloid mill during 30 minutes. The resulting paste is a colloid and gives with water just as the products of Examples 1 to 3 good colloidal solutions, showing all the characteristic features of such solutions. Also this product may be dried by means of a spraying apparatus and the dried product gives just as the paste stable colloidal solutions.

5. 1000 grammes of dehydrated calcium arsenate are with 100 grammes of dry sodium-pyrophosphate in a ball mill disintegrated during one hour in the dry state. The resulting product, which, if desired, may be passed through a sieve, gives with water beautiful, excellent, stable colloidal solutions, which show all the characteristics of truly colloidal solutions, viz the Brown movement, the Tyndall phenomenon and the property of being precipitated in the form of flocks by neutral electrolytes.

In the following claims I use the term "insoluble salts of the arsenic group" to include the earth alkali salts and the heavy metal salts of the arsenic acids and of the phosphoric acids. The term "water poor acids of the arsenic group" is intended to include the arsenic acids and phosphoric acids, which are formed from the ortho-acids by water being split off or which may be regarded as having been formed in this manner, oxy-acids being included as well as those corresponding acids, in which the oxygen is entirely or partly replaced by sulfur.

What I claim is:

1. In the art of producing colloidal compounds the step which consists in mechanically dispersing insoluble salts of acids of the arsenic group in the presence of alkali salts of water poor acids of the arsenic group.

2. In the art of producing colloidal compounds the step which consists in mechanically dispersing insoluble salts of acids of the arsenic group in the presence of alkali salts of water poor acids of the arsenic group and of protective colloids.

3. In the art of producing colloidal compounds the step which consists in mechanically dispersing insoluble salts of acids of the arsenic group in the presence of an alkali pyrophosphate.

4. In the art of producing colloidal compounds the step which consists in mechanically dispersing insoluble salts of acids of the arsenic group in the presence of sodium-pyrophosphate.

5. In the art of producing colloidal compounds the step which consists in mechanically dispersing calcium arsenate in the presence of alkali salts of water poor acids of the arsenic group.

6. In the art of producing colloidal compounds the step which consists in mechanically dispersing calcium arsenate in the presence of alkali salts of the water poor acids of the arsenic group and of protective colloids.

7. In the art of producing colloidal compounds the step which consists in mechanically dispersing previously heated calcium arsenate in the presence of alkali salts of water poor acids of the arsenic group.

8. In the art of producing colloidal compounds the step which consists in mechanically dispersing calcium arsenate which previously had been heated above 100° C. up to 600° C., in the presence of alkali salts of water poor acids of the arsenic group.

9. In the art of producing colloidal compounds the step which consists in mechanically dispersing calcium arsenate in the presence of an alkali pyro-phosphate.

10. In the art of producing colloidal compounds the step which consists in mechanically dispersing calcium arsenate in the presence of sodium-pyrophosphate.

11. In the art of poducing colloidal compounds the steps which consist in dry-grinding insoluble salts of acids of the arsenic group in the presence of alkali salts of water poor acids of the arsenic group.

12. In the art of producing colloidal compounds the steps which comprise grinding calcium-arsenate in presence of alkali salts of water poor acids of the arsenic group, both of which are in a dry state.

13. In the art of producing colloidal compounds the steps which comprise grinding calcium-arsenate in presence of an alkali pyrophosphate, both of which are in a dry state.

14. In the art of producing colloidal calcium arsenate the step which consists in dry-grinding partly dehydrated calcium arsenate in the presence of water poor acids of the arsenic group.

15. In the art of producing colloidal calcium arsenate the step which consists in dry-grinding calcium arsenate which previously had been heated above 100° C. up to 600° C., in the presence of water poor acids of the arsenic group.

16. A dry mixture for agricultural use, consisting of a salt of an acid of the arsenic group and of an alkali salt of a water poor acid of the arsenic group.

17. A dry mixture for use in destroying the animal parasites of plants, consisting of a salt of arsenic acid and of a water poor acid of the arsenic group.

18. A dry mixture for use in destroying the animal parasites of plants, consisting of calcium arsenate and of an alkali-pyrophosphate.

19. A dry mixture for use in destroying the animal parasites of plants, consisting of calcium arsenate, sodium pyrophosphate and of a protective colloid.

20. A dry mixture for use in destroying animal parasites of plants, consisting of calcium arsenate and of an alkali salt of a water poor acid of the arsenic group, which mixture, when distributed in water, has a hydrogen ion concentration between $P_H=7.07$ and $P_H=10$.

In testimony whereof I have affixed my signature.

AUGUST CHWALA.